(12) United States Patent
Miller et al.

(10) Patent No.: US 10,300,754 B2
(45) Date of Patent: May 28, 2019

(54) VEHICLE FLOATATION SYSTEM

(71) Applicants: Joseph Miller, Houston, TX (US);
Caroline Jackson, Houston, TX (US)

(72) Inventors: Joseph Miller, Houston, TX (US);
Caroline Jackson, Houston, TX (US)

( * ) Notice: Subject to any disclaimer, the term of this patent is extended or adjusted under 35 U.S.C. 154(b) by 186 days.

(21) Appl. No.: 15/403,504

(22) Filed: Jan. 11, 2017

(65) Prior Publication Data

US 2018/0194182 A1 Jul. 12, 2018

(51) Int. Cl.
*B63B 43/14* (2006.01)
*B60F 3/00* (2006.01)
*B60R 21/01* (2006.01)

(52) U.S. Cl.
CPC ............ *B60F 3/0038* (2013.01); *B60R 21/01* (2013.01); *B63B 43/14* (2013.01); *B60R 2021/01286* (2013.01); *B63B 2043/145* (2013.01)

(58) Field of Classification Search
CPC ........ B60R 21/01; B60F 3/0038; B63B 43/14
See application file for complete search history.

(56) References Cited

U.S. PATENT DOCUMENTS

| | | | | |
|---|---|---|---|---|
| 5,113,779 A | * | 5/1992 | Amrein | F41H 7/02 114/68 |
| 6,526,900 B2 | * | 3/2003 | Redman | B60F 3/0038 114/123 |
| 6,595,359 B1 | | 7/2003 | Allain et al. | |
| 6,798,346 B2 | | 9/2004 | Kim | |
| 6,881,108 B2 | | 4/2005 | Lin | |
| 7,287,482 B1 | | 10/2007 | Banchetto et al. | |
| 7,523,713 B2 | | 4/2009 | Farris | |
| 8,695,521 B2 | | 4/2014 | Dondurur | |
| 2013/0047906 A1 | | 2/2013 | Kuo | |

* cited by examiner

*Primary Examiner* — Stephen P Avila

(57) ABSTRACT

A vehicle floatation system for protecting a vehicle from water damage includes a vehicle. A floatation unit is provided and the floatation unit is coupled to the vehicle. The floatation unit is selectively inflated to float the vehicle on water. In this way the vehicle is protected from being damaged by flood waters.

3 Claims, 5 Drawing Sheets

VEHICLE FLOATATION SYSTEM

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION (1) Field of the Invention (2) Description of Related Art Including Information Disclosed Under 37 CFR 1.97 and 1.98

The disclosure and prior art relates to floatation devices and more particularly pertains to a new floatation device for protecting a vehicle from water damage.

BRIEF SUMMARY OF THE INVENTION

An embodiment of the disclosure meets the needs presented above by generally comprising a vehicle. A floatation unit is provided and the floatation unit is coupled to the vehicle. The floatation unit is selectively inflated to float the vehicle on water. In this way the vehicle is protected from being damaged by flood waters.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
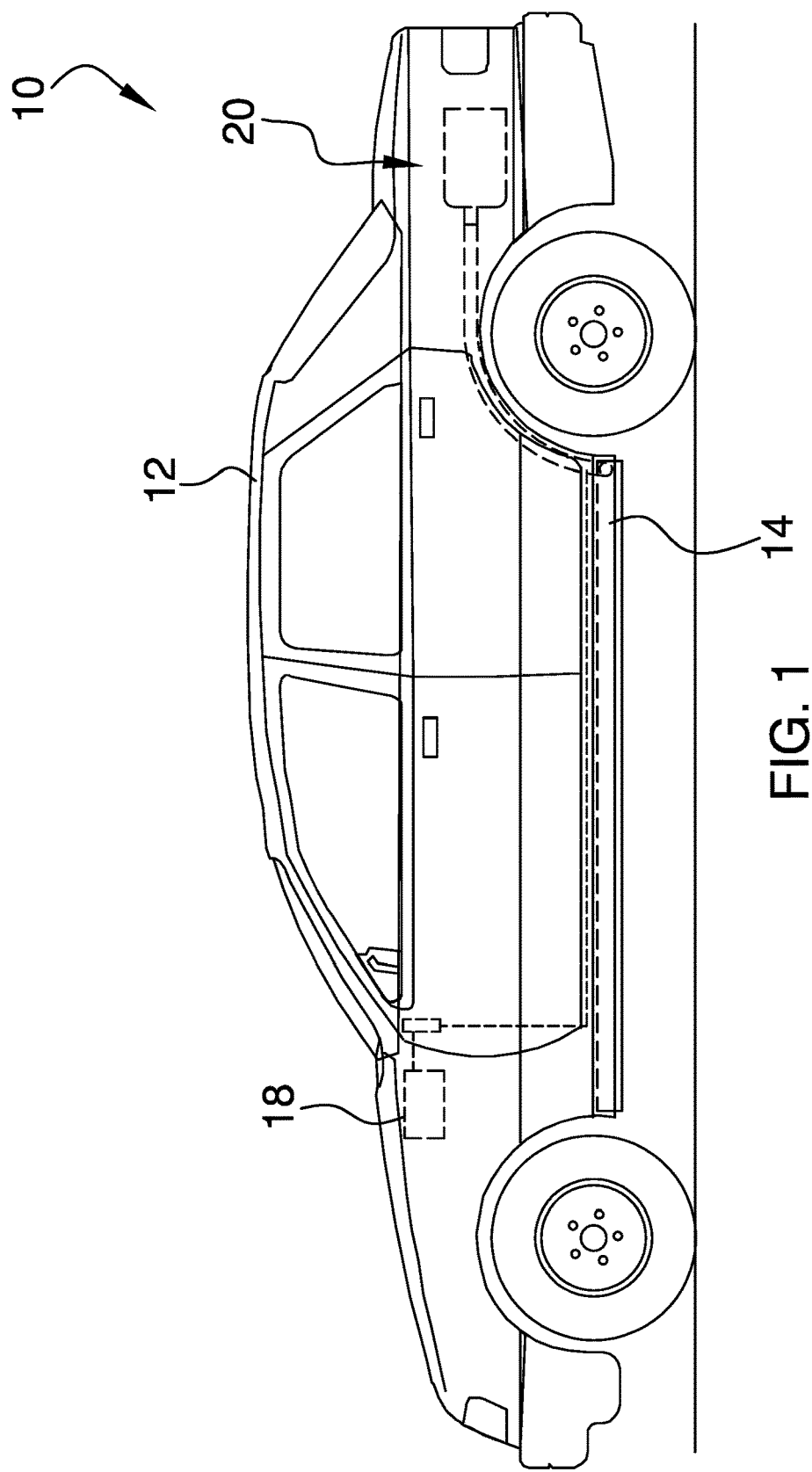
FIG. 1 is a phantom perspective view of a vehicle floatation system according to an embodiment of the disclosure.
Figure 2:
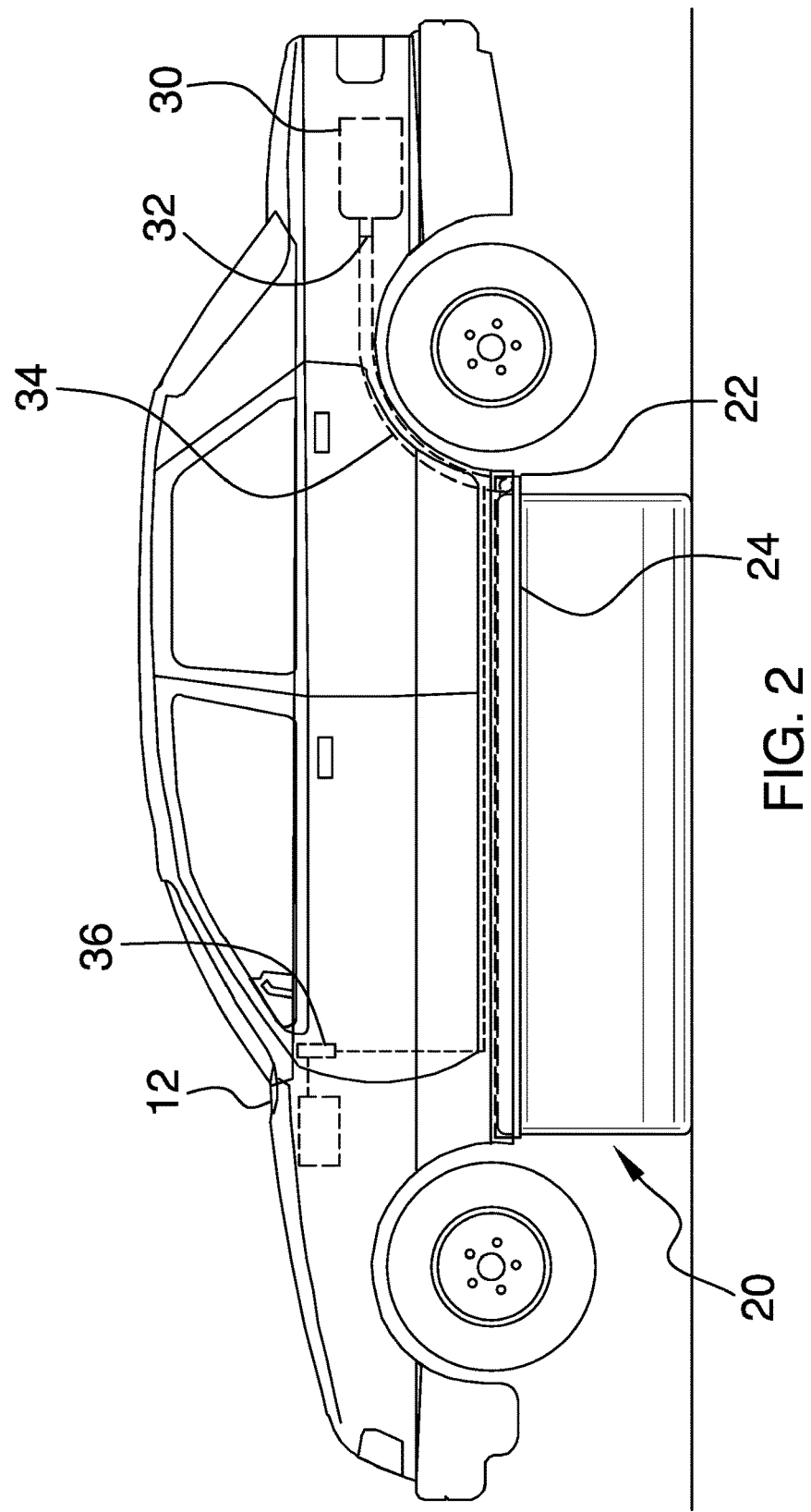
FIG. 2 is a phantom perspective view of an embodiment of the disclosure showing a floatation unit being inflated.
Figure 3:
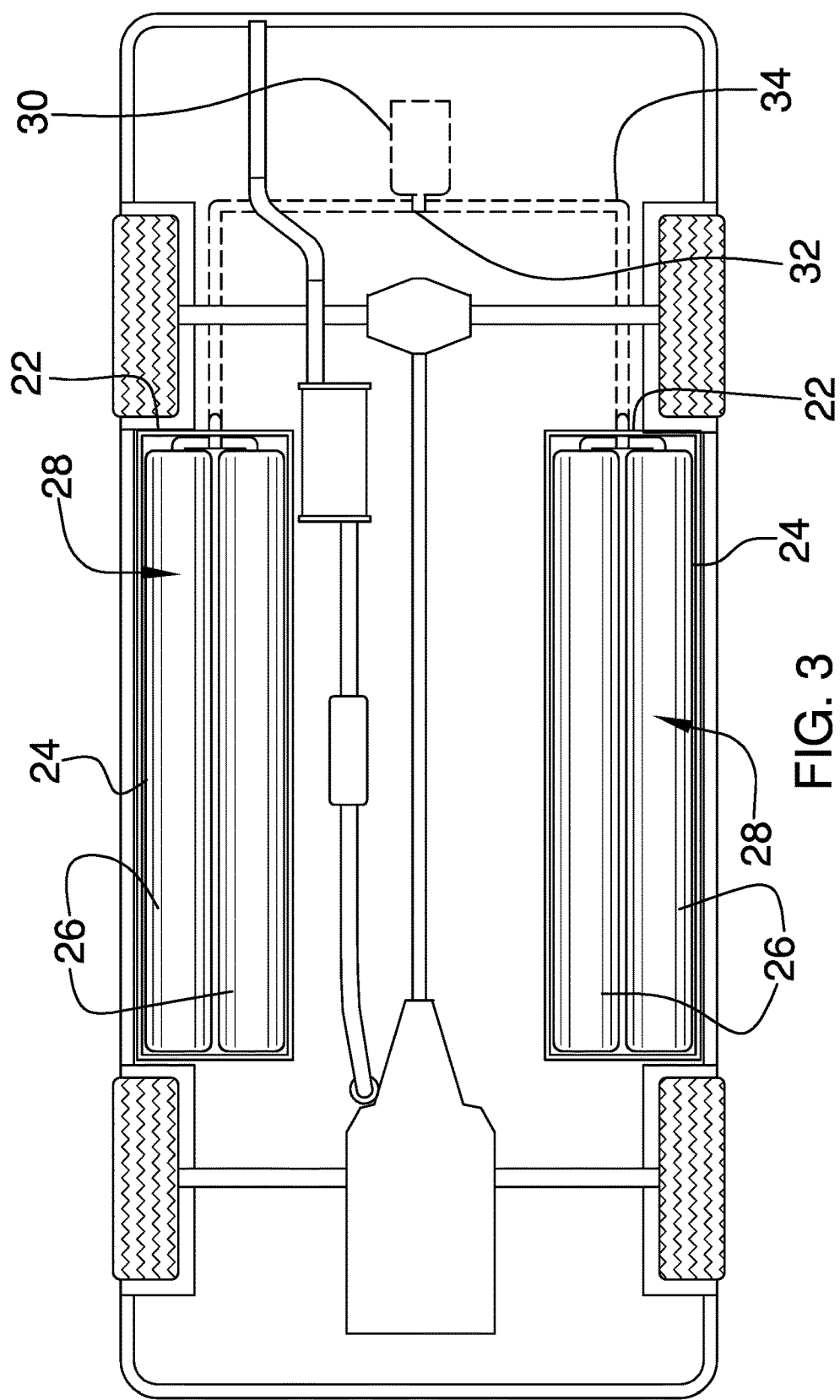
FIG. 3 is a bottom view of an embodiment of the disclosure.
Figure 4:
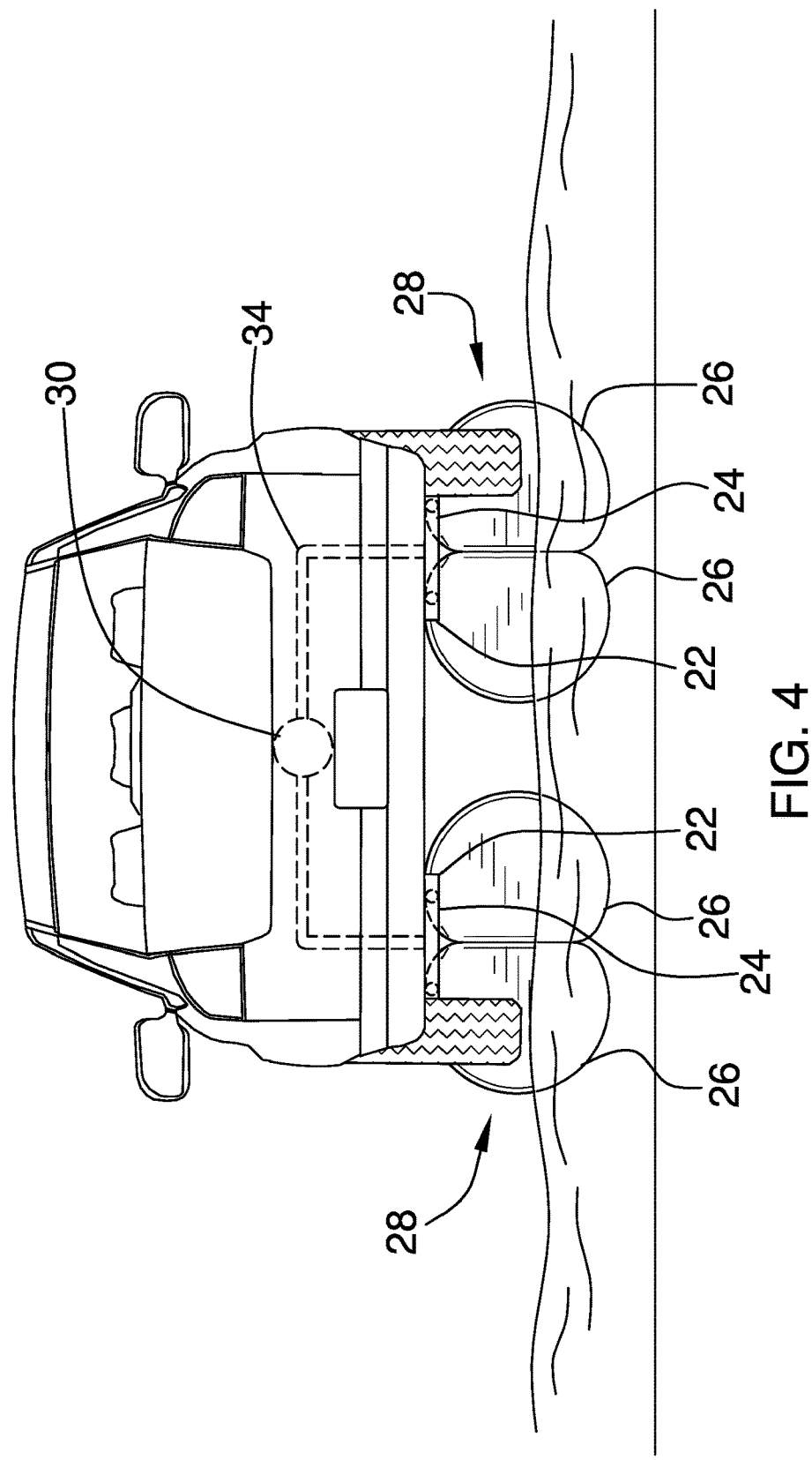
FIG. 4 is a back perspective in-use view of an embodiment of the disclosure.
Figure 5:
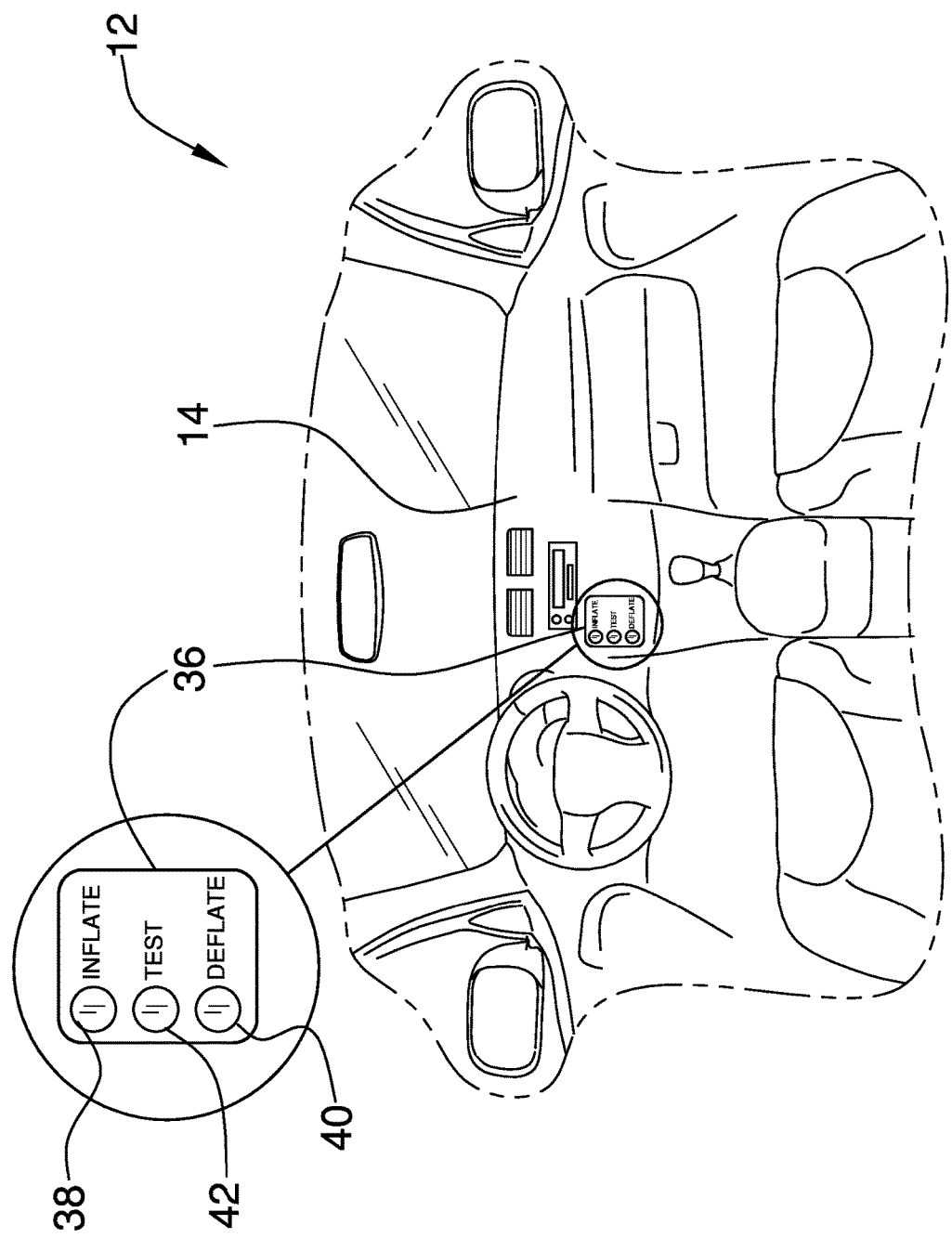
FIG. 5 is a perspective view of an embodiment of the disclosure.

With reference now to the drawings, and in particular to FIGS. 1 through 5 thereof, a new floatation device embodying the principles and concepts of an embodiment of the disclosure and generally designated by the reference numeral 10 will be described.

As best illustrated in FIGS. 1 through 5, the vehicle floatation system 10 generally comprises a vehicle 12 that has a lower side 14, a dashboard 16 and an electrical system 18. The vehicle 12 may be a passenger vehicle, a cargo vehicle or any other type of on-road vehicle. A floatation unit 20 is provided and the floatation unit 20 is coupled to the vehicle 12. The floatation unit 20 is selectively inflated to float the vehicle 12 on water. In this way the vehicle 12 is inhibited from being damaged by flood waters or the like.

The floatation unit 20 comprises a pair of housings 22 and each of the housings 22 is coupled to the lower side 14 of the vehicle 12. The housing are spaced apart from each other and each of the housings 22 is elongated to extend substantially along a length of the vehicle 12. Each of the housings 22 has a bottom side 24 and the bottom side 24 corresponding to each of the housings 22 is open.

A plurality of balloons 26 is provided and each of the balloons 26 is coupled to the vehicle 12. The plurality of balloons 26 is arranged into a pair of sets of balloons 28 and each of the sets of balloons 28 is positioned in an associated one of the housings 22. Moreover, each of the balloons 26 is coextensive with the associated housing. Each of the balloons 26 may be comprised of a puncture resistant material thereby inhibiting the balloons 26 from being damaged by debris or other unexpected objects.

A pump 30 is provided and the pump 30 is positioned within the vehicle 12. The pump 30 has an output 32 and the pump 30 may be an electric air pump 30 or the like. Moreover, the pump 30 may be electrically coupled to the electrical system 18 in the vehicle 12. A manifold 34 is fluidly coupled between the output 32 and each of the balloons 26. The pump 30 inflates each of the balloons 26 when the pump 30 is turned on. Each of the balloons 26 extends outwardly from the bottom end of the associated housing when each of the balloons 26 is inflated. The pump 30 selectively deflates each of the balloons 26.

A control 36 is provided and the control 36 is coupled to the dashboard 16. The control 36 is electrically coupled to the pump 30 and the electrical system 18 in the vehicle 12. The control 36 includes an inflate button 38, a deflate button 40 and a test button 42. The pump 30 inflates each of the balloons 26 when the inflate button 38 is manipulated. Additionally, the pump 30 deflates each of the balloons 26 when the deflate button 40 is manipulated. The pump 30 is temporarily turned on when the test button 42 is manipulated.

In use, the inflate button 38 is manipulated when the vehicle 12 encounters a flooded intersection, a flooded section of road or any other standing body of water. The pump 30 inflates each of the balloons 26 and the vehicle 12 floats on the water. In this way the water is inhibited from entering the vehicle 12 and damaging the vehicle 12. Additionally, the balloons 26 are selectively inflated when the vehicle 12 is parked and flood waters are expected. The deflate button 40 is manipulated to deflate each of the balloons 26 at any selected time. Additionally, the test button 42 is manipulated to test the pump 30 and ensure that the pump 30 and each of the balloons 26 is functioning properly.

With respect to the above description then, it is to be realized that the optimum dimensional relationships for the parts of an embodiment enabled by the disclosure, to include variations in size, materials, shape, form, function and manner of operation, system and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A vehicle floatation system comprising:
a vehicle having a lower side, a dashboard and an electrical system; and
a floatation unit being coupled to said vehicle, said floatation unit being selectively inflated wherein said vehicle is configured to float on water thereby inhibiting said vehicle from being damaged by flood waters, said floatation unit comprising a pair of housings, each of said housings being coupled to said lower side of said vehicle, said housing being spaced apart from each other, each of said housings being elongated to extend substantially along a length of said vehicle, each of said housings having a bottom side, said bottom side corresponding to each of said housings being open;
a plurality of balloons, each of said balloons being coupled to said vehicle, said plurality of balloons being arranged into a pair of sets of balloons, each of said sets of balloons being positioned in an associated one of said housings, each of said balloons being coextensive with said associated housing;
a pump; and
a control being coupled to said dashboard wherein said control is configured to be manipulated, said control being electrically coupled to said pump and said electrical system in said vehicle, said control including an inflate button, a deflate button and a test button, said pump inflating each of said balloons when said inflate button is manipulated, said pump deflating each of said balloons when said deflate button is manipulated, said pump being temporarily turned on when said test button is manipulated.

2. The system according to claim 1, further comprising:
said pump being positioned within said vehicle, said pump having an output; and
a manifold being fluidly coupled between said output and each of said balloons, said pump inflating each of said balloons when said pump is turned on such that each of said balloons extends outwardly from said bottom end of said associated housing.

3. A vehicle floatation system comprising:
a vehicle having a lower side, a dashboard and an electrical system; and
a floatation unit being coupled to said vehicle, said floatation unit being selectively inflated wherein said vehicle is configured to float on water thereby inhibiting said vehicle from being damaged by flood waters, said floatation unit comprising:
a pair of housings, each of said housings being coupled to said lower side of said vehicle, said housing being spaced apart from each other, each of said housings being elongated to extend substantially along a length of said vehicle, each of said housings having a bottom side, said bottom side corresponding to each of said housings being open,
a plurality of balloons, each of said balloons being coupled to said vehicle, said plurality of balloons being arranged into a pair of sets of balloons, each of said sets of balloons being positioned in an associated one of said housings, each of said balloons being coextensive with said associated housing,
a pump being positioned within said vehicle, said pump having an output,
a manifold being fluidly coupled between said output and each of said balloons, said pump inflating each of said balloons when said pump is turned on such that each of said balloons extends outwardly from said bottom end of said associated housing, said pump selectively deflating each of said balloons, and
a control being coupled to said dashboard wherein said control is configured to be manipulated, said control being electrically coupled to said pump and said electrical system in said vehicle, said control including an inflate button, a deflate button and a test button, said pump inflating each of said balloons when said inflate button is manipulated, said pump deflating each of said balloons when said deflate button is manipulated, said pump being temporarily turned on when said test button is manipulated.

\* \* \* \* \*